Figure 1:
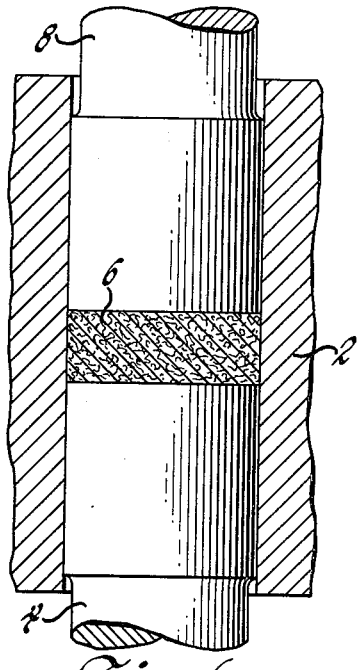

Nov. 28, 1961  R. W. SMITH ET AL  3,010,196
METHOD FOR MAKING COMPOSITE METAL MEMBERS
Filed Sept. 25, 1957  3 Sheets-Sheet 1

INVENTORS.
Robert W. Smith,
Raymond E. Schwyn &
BY Karl Schwartzwalder

J. E. Ross
ATTORNEY

Nov. 28, 1961 R. W. SMITH ET AL 3,010,196
METHOD FOR MAKING COMPOSITE METAL MEMBERS
Filed Sept. 25, 1957 3 Sheets-Sheet 2

INVENTORS.
Robert W. Smith,
Raymond E. Schwyn &
BY Karl Schwartzwalder

ATTORNEY.

Nov. 28, 1961

R. W. SMITH ET AL 3,010,196

METHOD FOR MAKING COMPOSITE METAL MEMBERS

Filed Sept. 25, 1957

3 Sheets-Sheet 3

INVENTORS.
Robert W. Smith,
Raymond E. Schwyn &
BY Karl Schwartzwalder

J. E. Ross
ATTORNEY.

United States Patent Office 3,010,196
Patented Nov. 28, 1961

3,010,196
METHOD FOR MAKING COMPOSITE METAL MEMBERS
Robert W. Smith and Raymond E. Schwyn, Flint, and Karl Schwartzwalder, Holly, Mich., assignors to General Motors Corporation, Detroit, Mich., a corporation of Delaware
Filed Sept. 25, 1957, Ser. No. 686,211
12 Claims. (Cl. 29—420.5)

This invention relates to an improved method for manufacturing rod-shaped composite metal members having particular utility as spark plug electrodes.

For many years one of the major goals in the spark plug art has been that of attaining a low-cost electrode having a highly increased useful life. It is well known that spark plug electrode life can be increased by increasing the rate at which heat is conducted away from the firing tip, i.e., by increasing the heat conductivity of the electrode, and to this end it has been the practice in the manufacture of relatively expensive aircraft spark plugs, to use a composite center electrode which comprises an outer sheath of high wear-resistant metal such as nickel or nickel alloy and a core of high heat conducting metal, for example, copper. Such electrode structure is shown by United States Patent 2,296,033, issued September 15, 1942 to W. F. Heller. Because of the high heat conductivity of the core which keeps the firing tip of the sheath relatively cool, this composite type electrode has a greatly increased life in comparison to a one-metal electrode such as one of solid nickel; however, until now its use has been restricted because of the difficulties of manufacture and therefore the expense factor. In recent years the tremendous increase in truck and automobile engine compression ratios and horsepower outputs has so increased the problem of spark plug electrode wear that the need has become particularly pressing for a low-cost, long life, composite electrode. The present invention fills this need.

It is one of the objects of the present invention to provide an improved method for manufacturing rod-shaped composite metal members having an outer metal sheath bonded to an inner metal core. Another object is to provide a method for manufacturing improved spark plug electrodes. Still another object is the provision of a method for making an improved multi-layer metal billet useful for the manufacture of rod-shaped composite metal members. A more particular object of the invention is to provide a method which substantially reduces the cost of manufacturing rod-shaped composite metal members. Other objects and advantages of the invention will appear from the description which follows:

In general, the process of the present invention comprehends the steps of first forming a multi-layer composite metal billet from powdered metals by pressing and sintering operations, and subsequently extruding the billet to form a generally rod-shaped member having an outer metal sheath alloy-bonded to an inner metal core. Particularly because of the means used to form the composite metal billet for the extrusion operation, substantial manufacturing economies are accomplished as well as improved quality in the final product. A highly improved spark plug electrode is accomplished simply and at low cost.

As the first step in the process a layer of metal powder is formed to the desired shape as in a suitable die. Then a layer of another metal powder is formed to the desired shape and the two layers are pressed together with high pressure to thereby form a multi-layer green compact. This compact is sintered by heating and then preferably again pressed with high pressure to reduce porosity and increase density, after which it may be annealed to provide increased ductility. The resulting multi-layer metal billet is then extruded in a die to form the desired rod-shaped composite metal member having an outer sheath of one metal bonded by alloying to an inner core of other metal. If desired, the compact may be formed with more than two metal layers to thereby accomplish a composite metal sheath or a multi-metal core in the extruded product.

Figure 2:
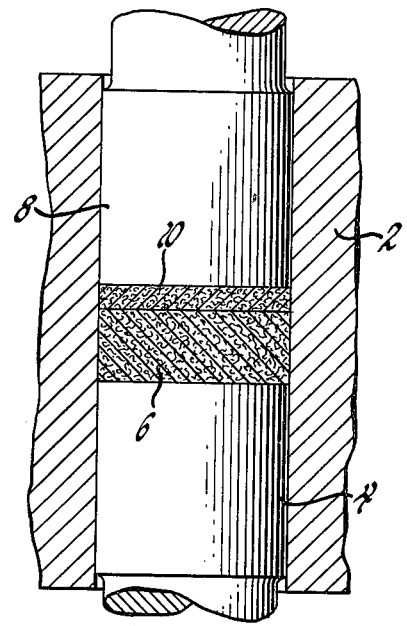
Figure 3:
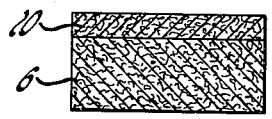
Figure 4:
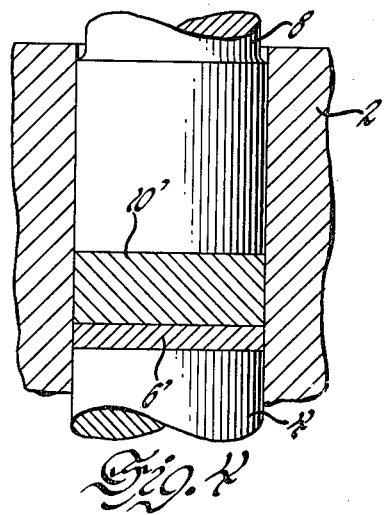
Figure 5:
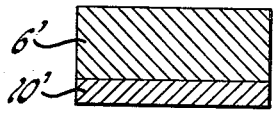
Figure 6:
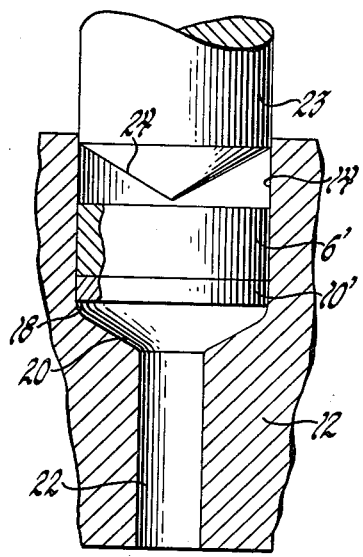
Figure 7:
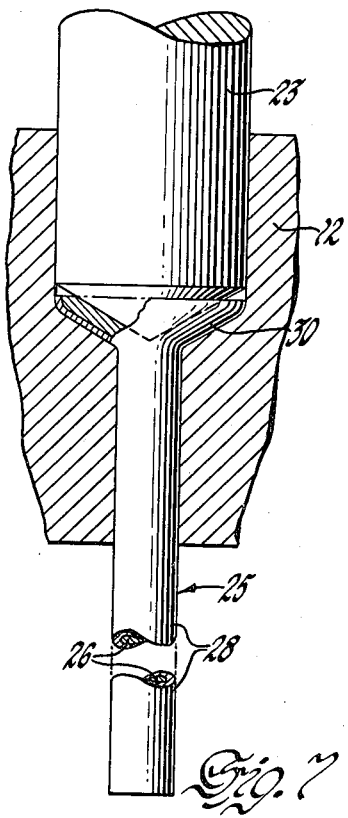
Figure 8:
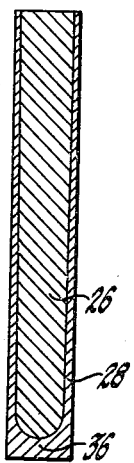
Figure 9:
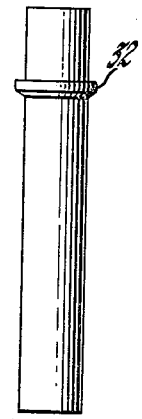
Figure 10:
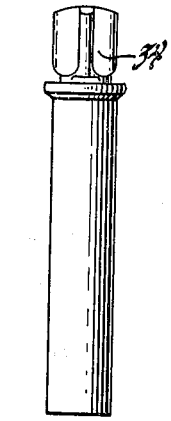

The following detailed description of a specific embodiment of the process made with reference to the appended drawings will serve to illustrate. In the drawings, FIGURE 1 shows the initial step in the process;
FIGURE 2 shows a succeeding step in the process;
FIGURE 3 shows the product, in section, resulting from the process step shown in FIGURE 2;
FIGURE 4 shows one of the process steps which follows that shown in FIGURE 2;
FIGURE 5 shows the product, in section, resulting from the process step shown in FIGURE 4;
FIGURE 6 shows a process step which follows that shown in FIGURE 4;
FIGURE 7 shows a later stage in the process step shown in FIGURE 6;
FIGURES 8, 9 and 10 show the respective products of three process steps which may be used succeeding that shown in FIGURES 6 and 7, FIGURE 10 showing the final product of the process; and
FIGURES 11–18 illustrate other embodiments of the invention.

Referring now to the drawings, a measured charge of copper powder (100 mesh containing about 20% minus 325 mesh), having admixed therewith about 1% of a suitable lubricant such as hydrogenated cottonseed oil, is placed in a cylindrical die opening and leveled as by light tamping or sweeping. This is shown in FIGURE 1, the die opening being formed by the cylindrical bore in metal block 2 with bottom punch 4 inserted therein, and light tamping of copper powder 6 being accomplished by moving upper punch 8 into the die opening against the copper powder. In this particular embodiment the die opening is .372 inch in diameter, 2.25 grams of copper powder being used.

Next, the upper punch is withdrawn and a measured charge, .65 gram in this embodiment, of nickel powder 10 (100 mesh grade containing about 30% minus 325 mesh), also having admixed therewith about 1% lubricant such as hydrogenated cottonseed oil, is placed over the leveled copper powder after which upper punch 8 is reinserted in the die as in FIGURE 2, first lightly to merely level the nickel powder and then at about 100,000 pounds per square inch pressure to tightly compress the metal powders into a two-layer green compact, as shown in FIGURE 3, having a relatively thick copper layer 6 and a relatively thin nickel layer 10. The compact is removed from the die by moving both punches, 4 and 8, either up or down and out of the block 2.

The copper-nickel compact is then sintered, preferably in a hydrogen atmosphere furnace, using an initial slow heating rate in order to drive out the lubricant without cracking or blistering the metal powders. A rate of 200° F. per 5 minutes until reaching about 1000° F. is satisfactory, after which the temperature may be raised as rapidly as desired to 1850° F. and held there for one hour to complete the sintering. Then the parts are cooled, also preferably in a hydrogen atmosphere.

After the sintering operation, the resulting bimetal billet is pressed with high pressure to increase the density, and therefore slightly reduce the volume, of the billet and increase its ductility for the subsequent extrusion operation. If desired, this pressing operation may be performed as shown in FIGURE 4 using the same press as was used in the compacting operation. About 150,000 pounds per square inch pressure is applied to thereby effect about a 15% reduction in volume of the billet with a commensurate increase in density.

To further increase ductility prior to the extrusion operation, the billet is next annealed at 1850° F. in a hydrogen atmosphere for about two hours. The sintered, pressed and annealed bimetal billet ready for the extrusion operation is shown in FIGURE 5, 6' being the relatively thick copper layer and 10' being the relatively thin nickel layer. These layers are, of course, intimately bonded together by way of the alloying at the interface which takes place in the sintering operation.

For the extrusion operation the billet is placed nickel layer down in an extrusion die as shown in FIGURE 6, this die comprising a block 12 having a cylindrical pressure chamber 14 of such diameter as to snugly receive the bimetal billet. The lower end of the cylindrical chamber curves gradually inwardly, as shown at 18, into a conical shaped bottom surface 20 which communicates with a cylindrical extrusion bore 22 having a diameter the same as that desired for the member to be formed. Punch 23 is provided with a conical shaped contacting surface 24 of about the same taper as bottom wall 20 of the die. With the billet positioned nickel layer down as shown in FIGURE 6 and coated with a suitable high pressure lubricant, such as a soap type drawing compound (for example, ordinary fatty acid type soap plus about 35% borax) or the like, the punch is actuated downwardly to thereby press the billet through the extrusion bore 22 and form the rod-shaped bimetal member 25 (see FIGURE 7) wherein 26 is the copper core and 28 is the nickel sheath closed at the lower end and bonded by interface alloying with the core. During the extrusion operation the metal is further compacted any may undergo a reduction in volume of up to about three percent or more.

The member 25 is then removed from the die after which the conical head 30 may be cut away to provide the structure as shown in FIGURE 8. Then the upper end portion can be shaped as desired, by conventional forming or cutting operations. For example, an outwardly extending flange 32 adjacent the upper end of the extruded member may be formed as shown in FIGURE 9 by heading operation, and thereafter the portion above the flange shaped to a cross-shaped cross section as shown at 34 in FIGURE 10, this to provide greater surface area for bonding with a conductive glass seal in the spark plug in which the member is used as a center electrode. Other shapes providing large surface area adjacent the upper end of the rod-shaped member may be used, as for example is shown in United States Patent 2,459,282 to T. G. McDougal et al. and in the aforementioned United States Patent 2,296,033 to W. F. Heller.

If desired, the member may be extruded or shaped after extrusion to provide a hexagonal, octagonal, oval or other cross-section instead of a round one as shown in the drawings.

In the embodiment of the process described above and as shown in FIGURES 1 through 10, it will be noted that the nickel and copper layers of the billet as shown, for example, in FIGURE 5 are flat, this by way of the flat bottom surface of punch 8 used in the green compact forming operation. In the electrode made from this billet, the bottom of the nickel sheath, as shown at 36 in FIGURE 8, is of the same thickness as that of the nickel layer 10' of the billet and the side wall of the sheath decreases in thickness abruptly for a short distance and then very gradually from bottom to top. One of the highly advantageous features of the present invention is that the thickness of the bottom and sides of the outer metal sheath can be selected and closely controlled, this by choice of the shape of the punch used in forming the layers of the green compact. Thus, various improved electrode structures not heretofore commercially feasible can be produced simply and inexpensively. FIGURES 11 through 16 will serve to illustrate.

Figure 11:
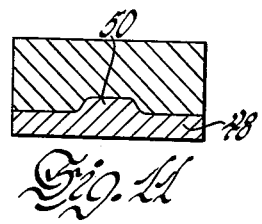
Figure 12:
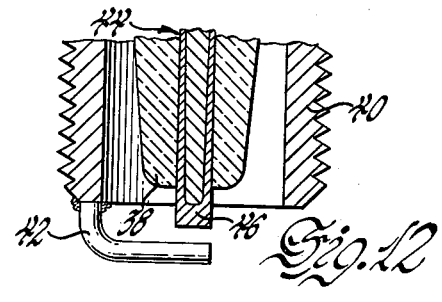

In FIGURE 12 there is shown a spark plug comprising a conventional ceramic insulator 38 secured within a metal shell 40 having a ground electrode 42 welded thereto and extending into spaced relation with the end of composite center electrode 44 to form an end-gap type spark gap. Because the spark gap is of the end-gap type, i.e., formed between the ground electrode and the bottom (rather than the sides) of the center electrode, the bottom of the center electrode 44 is required to have the greatest resistance to spark erosion. Thus, it is desirable that it have a relatively thick section of heat and wear resistant nickel as shown at 46. FIGURE 11 illustrates how an embodiment of the present invention can be used to make such an electrode, the billet shown being for this embodiment the counterpart of that shown in FIGURE 5 of the previously described embodiment. The nickel layer 48 of the billet shown in FIGURE 11 has a center portion 50 which is of increased thickness in comparison to the peripheral portions of said layer, this being accomplished by appropriately shaping the punch used in initially forming the layers of the green compact. For example, if the copper layer is formed first as is described in the previous embodiment, the punch used in this first step is provided with a raised center portion so that the copper layer is formed with a depression. Then a flat punch is used in forming the nickel layer and the remainder of the process may be exactly as previously described to thereby produce the billet, as shown in FIGURE 11, and thence, after extrusion, the electrode structure, as shown in FIGURE 12. Obviously, if in making the green compact the nickel layer is formed first, it is necessary, in order to form a billet such as shown in FIGURE 11, to first use a punch having a depression at its center portion and then a flat punch in forming the copper layer.

Figure 13:
Figure 14:
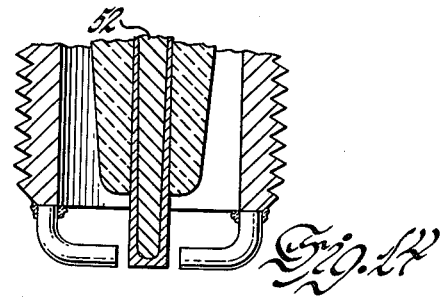

FIGURE 14 shows a spark plug having a composite center electrode 52 wherein the thickness of the bottom of the nickel sheath is substantially the same as the thickness of the side walls thereof, and FIGURE 13 illustrates an embodiment of the present invention that can be used to make such structure. In this instance, the nickel layer 54 is formed with a reduced thickness at its center portion 56. It will be obvious that to produce this billet the punch used in forming the first layer of the green compact will be provided with either a depression or a raised portion depending upon which layer is formed first. Also, it will be obvious that upon extrusion of the billet shown in FIGURE 13 a composite electrode having a sheath with a relatively thin bottom wall, such as shown in FIGURE 14, will result.

Figure 15:
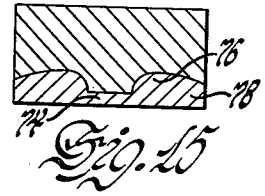
Figure 16:
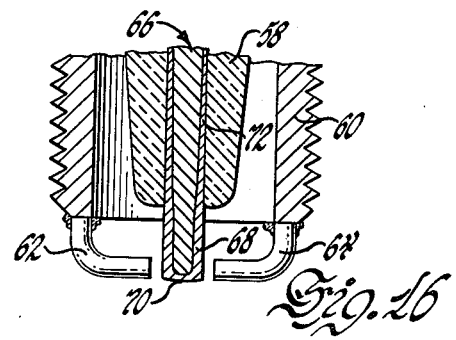

FIGURE 16 shows a spark plug having a new and highly improved center electrode structure which can be simply and economically manufactured by another embodiment of the present invention. In this spark plug, 58 is the insulator, 60 the shell, 62 and 64 a pair of ground electrodes secured to the shell, and 66 the center electrode. It will be noted that the ground electrodes 62 and 64 extend into spaced relation with the sides of the centerwire thereby forming a side-gap type spark gap. It is highly advantageous, therefore, that the bottom portion 68 of the sheath side walls of the center electrode have a relatively thick section of heat and wear resistant nickel in order to provide increased electrode life. There being very little wear on the bottom of the electrode, it is preferable to have a thin nickel section 70 at this point. To accomplish the highest heat conductivity away from the firing tip, it is desirable to utilize as thick a copper core as possible above the firing portion of the electrode and to this end it is preferable that the upper portion 72 of the sheath side walls be relatively thin. FIGURE 15 illustrates an embodiment of the present invention which can be used to manufacture this electrode. In the billet shown in FIGURE 15 the nickel layer is formed with a relatively thin center portion 74. The next radially outward portion of the nickel layer rapidly increases in thickness as shown at 76 and then gradually thins out toward the periphery 78. It will be obvious that such a billet can easily be made by appropriately shaping the punch used in making the green compact. Upon extrusion of this billet the electrode structure shown in FIGURE 16 will result, the portion 74 of the billet forming the bottom 70 of the electrode, portion 76 of the billet resulting in thickened side wall 68 of the electrode and portion 78 of the billet developing thin side wall portion 72 of the electrode.

Having illustrated four different types of electrode structures which can be made from embodiments of the invention, it will be clear that numerous other embodiments are possible. The process can be used to economically manufacture bimetal composite spark plug electrodes having accurately predetermined sheath and core thicknesses in order to provide maximum wear resistance for the particular type of spark gap which is to be used. The nickel may be made thick precisely at the point where the sparking will take place and the copper core can be made thick in the other portions of the electrode to thereby attain maximum heat conductance away from the firing tip to still further increase wear resistance.

Thus far, the invention has been described with reference to the use of nickel and copper as the metals for manufacturing the composite rod-shaped members; however, other metals or metal alloys may be used, all within the spirit and scope of the invention. Particularly for use in spark plug electrodes, copper is, of course, highly advantageous as a core material because it is relatively inexpensive and has excellent heat conductivity which is a prime property required of the core. Nickel is the traditional material used for spark plug electrodes, this because of its highly advantageous properties of heat and wear resistance. The chief disadvantage of nickel is its cost and at times its scarcity. The present invention enables and promotes, so to speak, the use of other metals for spark plug electrodes since it provides an economical and therefore commercially feasible means for accomplishing electrode structural improvements which lessen the qualities needed of the electrode materials. For example, because of this highly improved heat conductance of electrodes manufactured in accordance with the process of this invention, the electrode sheath may, for some types of spark plugs, be made of iron or iron base alloy rather than the more expensive nickel, compensation for the lesser heat and wear resistance of the iron as compared to nickel being made by the increased heat conductivity of the improved structure. In general, therefore, the invention is intended to comprehend the use of any high heat and wear resistant metal as the sheath material and any metal of high heat conductivity as the core material. In aircraft spark plugs requiring optimum wear resistance and performance characteristics despite cost, silver may serve to advantage as the core metal and platinum as the sheath metal. Such an electrode made by the process of this invention is not only better, but also lower in cost than the presently used solid platinum aircraft spark plug electrodes; lower in cost because a large portion of the extremely expensive platinum is replaced with less expensive silver.

Figure 17:
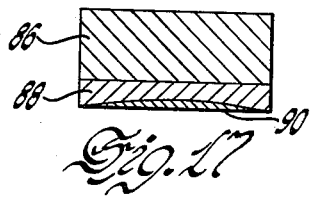
Figure 18:

The invention is also intended to comprehend the manufacture of composite members wherein more than two metals are used. In this regard, reference is directed to FIGURE 18 which shows a composite electrode having a copper core 80, an iron sheath 82 bonded to the core, and a nickel layer 84 over the firing tip of the electrode and bonded to the iron sheath. FIGURE 17 shows the billet which illustrates how such an electrode can be made in accordance with the present invention, the thick upper layer 86 being copper, the thinner layer 88 being iron and the layer 90 being nickel. Since the nickel is desired only at the firing tip of the extruded electrode, nickel layer 90 extends only over the center portion of the bottom of the billet as shown. It will be obvious that the billet shown in FIGURE 17 can be made in accordance with the present invention by first forming the copper layer flat on both sides, then forming the iron layer flat on the bottom but with a slight spherical depression in the center of its top surface, and then forming the nickel layer within the spherical depression in the iron layer. With the green compact of the powdered metals thus formed, the other operations leading to the completed electrode structure, as shown in FIGURE 18, may be generally as previously described.

The following points may be found helpful in the practice of the present invention.

Where copper is used as the core material, it is generally desirable that it be at least somewhat coarser than 100% minus 325 mesh. Extremely fine powder, i.e., 100% minus 325 mesh, has a tendency to blister during the sintering operation. A 100 mesh grade containing approximately 20% minus 325 mesh is excellent. Coarser grades may also be used, though for ease in the pressing operation to form the green compact relatively fine grade powder is advantageous.

Where nickel is used as the sheath material, the raw material can advantageously be direct-from-ore powder; mesh size is not critical though a fine grade powder is advantageous in connection with the compacting operation. A minus 100 mesh containing 30% minus 325 mesh is excellent.

Any lubricant used in the metal powders for the compacting operations should preferably be such as to leave no post-sintering residue. Hydrogenated cottonseed oil is excellent. While it is advantageous, it is not essential that the metal powder layers be initially formed one directly over the other. If desired, for example, a copper powder green compact and a nickel powder green compact may be formed, each separately, and the two then assembled, one over the other, and compressed together with high pressure to form the multi-layer green compact.

The precise sintering temperatures, times and conditions will vary according to the metals being used, as is well known in the metals sintering art. Where iron is used, for example, a sintering temperature of 1850° F. is satisfactory. The sintering temperature should not exceed the melting point of the lowest melting point metal or metal alloy used in the billet. Where the powdered metals, or any of them, are susceptible to oxidation, it is desirable to utilize a nonoxidizing atmosphere, such as hydrogen or other reducing or inert gas, during the sintering operation and during the cooling which follows. A vacuum may also be used during the heating and cooling operations to prevent oxidation.

The post-sintering pressing and annealing operations are highly desirable, the former particularly for the avoidance of minute pin holes and porosity in the tip of the extruded structure. It will be noted that in the extrusion operation, no substantial compacting of the metal occurs right at the tip of the extruded member. Yet, the tip portion is precisely where high density is most needed, particularly for end-gap type spark gaps since it is the portion most subject to wear. By means of the post-sintering pressing operation, high density is accomplished prior to extrusion and, thus, a very dense, wear-resistant firing tip is accomplished.

The precise design of the extrusion die will, of course, depend upon the exact extruded shape desired. However, in all instance we have found it highly advantageous that the die have structure, as shown in FIGURE 6, wherein the bottom surface 20 is tapered downwardly and inwardly toward the extrusion bore 22, and wherein the punch 24 is provided with a projection such as conical surface 24. These features reduce the amount of ram pressure required for the extrusion operation. The projection 24 in the punch serves the additional purpose of assuring that the core material, which is formed by the upper layer of the billet, extends to adjacent the bottom of the extrusion. Where the projection is conical, as shown, it also serves to reduce the amount of material needed for the upper layer, the conical head of the extruded shape in most instance being removed and constituting scrap. The extrusion die should preferably be made of tungsten carbide, although a high carbon-high chromium tool steel is satisfactory, particularly for short runs. Good results can be obtained in either a mechanical punch press at high speed or in a hydraulic press at low speed, the former having the big advantage of a high production rate. There is no necessity to heat the billet for the extrusion operation though it may be if desired. To facilitate removal of the extruded members from the die, any suitable ejector structure such as a knock-out pin designed to contact the bottom of the extruded shape and push it up and out of the die, serves satisfactorily.

As stated previously, one of the chief advantages of the present invention is the flexibility it allows in the precise design of composite electrode structure. Highly improved electrode structures which have heretofore been impossible to produce on a commercial basis are made practical by the invention. Another big advantage to the invention is that it accomplishes an improvement in composite electrode structure by way of the improved bonding between the sheath material and the core material. It has been found that even the slightest pockets or voids between the sheath and the core, particularly adjacent the firing tip, have an extremely detrimental effect on the wear characteristics of composite electrodes. With the present invention, excellent continuous alloy bonding between the metal layers effected during the pressing and sintering operations assures optimum heat conductivity from the sheath to the core of the extruded electrode. From the economics standpoint, the invention has the tremendous advantage of greatly reducing the amount of scrap which has heretofore been inherent in the manufacture of composite electrodes, this because measured amounts of metal powders are utilized as the raw materials instead of sheet stock or wire from which large portions must be cut away. Another advantage from the economics standpoint is that metal powders, even though of higher purity than sheet or wire stock, may nevertheless be less expensive. For example, nickel powder such as is produced directly from the ore is generally less expensive than solid nickel wire or sheet stock. Such nickel powder is of high purity and excellent for the practice of the present invention in making composite spark plug electrodes.

While the invention has been described with reference to the manufacture of composite spark plug electrodes, this being a field in which it finds immediate and particularly advantageous utility, it will be obvious that other types of generally rod-shaped composite metal members may be made by the process, and the invention in its broader scope is intended to comprehend such other uses. Also, while the invention has been described with reference to particular embodiments thereof, it is not so limited since various changes and modifications may be made, all within the full and intended scope of the claims which follow.

We claim:
1. A process for making a rod-shaped composite metal member having a thin hard outer metal sheath filled with and bonded to an inner metal core comprising the steps of forming a pressed compact having a thin layer of hard metal powder and a thick layer of a different powdered metal, heating said compact to sinter said layers of powdered metal and thereby form a one-piece multi-layer billet, pressing said billet to increase its density, placing said billet in a pressure chamber having a converging end communicating with a die opening and then extruding said billet, by pressing the thick layer toward the thin layer, through said die opening to thereby form the rod-shaped member.

2. A process for making a rod-shaped composite metal member having an outer metal sheath bonded to an inner metal core comprising the steps of forming a multi-layer compact having a thin layer of a powdered relatively hard metal and a thick layer of powdered relatively soft metal, heating said compact to sinter said layers of powdered metal and thereby form a one-piece multi-layer billet, pressing said billet to increase its density, heating said billet to annealing temperature to thereby increase its ductility, placing said billet in a pressure chamber having a converging end communicating with a die opening and then extruding said billet, by pressing the soft layer toward the hard metal layer, through said die opening to thereby form the rod-shaped member.

3. A process for making a rod-shaped composite metal member having an outer sheath of relatively hard metal bonded to an inner core of relatively soft metal comprising the steps of forming a powder layer of one of the metals, forming a powder layer of the other of the metals over said first layer, tightly compressing said layers to form a compact, heating said compact to sinter said layers of powdered metal and thereby form a billet, pressing said billet to increase its density, placing said billet in a pressure chamber having a converging end communicating with a die opening and then extruding said billet, by pressing the relatively soft metal layer toward the relatively hard metal layer, through said die opening to thereby form the rod-shaped member.

4. A process for making a rod-shaped composite metal member having an outer sheath of nickel bonded to an inner core of copper comprising the steps of forming a pressed-powder compact having a nickel layer and a copper layer, heating said compact to sinter said layers of powdered metal and thereby form a one-piece multi-layer billet, pressing said billet to increase its density, placing said billet in a pressure chamber having a converging end communicating with a die opening and then extruding said billet, by pressing the copper layer toward the nickel layer, through said die opening to thereby form the rod-shaped member.

5. A process for making a rod-shaped composite metal member having a relatively thin outer sheath of nickel bonded to an inner core of copper comprising the steps of forming a pressed-powder compact having a relatively thin nickel layer and a relatively thick copper layer, heating said compact in a hydrogen atmosphere to sinter said layers of powdered metal and thereby form a one-piece multi-layer billet, pressing said billet to increase its density, heating said billet to anneal the nickel layer and thereby increase its ductility, placing said billet in a pressure chamber having a converging end communicating with a die opening and then extruding said billet, by pressing the copper layer toward the nickel layer, through said die opening to thereby form the rod-shaped member.

6. A process for making a rod-shaped composite metal member having a relatively thin outer sheath of nickel bonded to an inner core of copper comprising the steps of forming a relatively thin layer of powdered nickel, forming a relatively thick layer of powdered copper over said nickel layer, pressing said layers together with about 100,000 pounds per square inch pressure to thereby form a compact, heating said compact in a nonoxidizing atmosphere to to about 1850° F. to sinter said layers of powdered metal and thereby form a one-piece multi-layer billet, pressing said billet with about 150,000 pounds per square inch pressure to increase its density, heating said billet to about 1850° F. to anneal the nickel layer and thereby increase its ductility, placing said billet in a pressure chamber communicating with a die opening and then extruding said billet, by pressing the copper layer toward the nickel layer, through said die opening to thereby form the rod-shaped member.

7. A process for making a rod-shaped composite metal member comprising the steps of forming a pressed compact having a relatively thin layer of a hard metal powder and a relatively thick layer of another powdered metal, heating said compact to sinter said layers of powdered metal and thereby form a one-piece multi-layer billet, placing said billet in a pressure chamber having a converging end wall with a die opening therein such that the relatively thin layer of said billet faces said die opening and then extruding said billet through said die opening to thereby form said billet into a member having a thin outer metal sheath filled with an inner metal core.

8. A process for making a rod-shaped composite metal member comprising the steps of forming a pressed compact having a relatively thin layer of powdered hard metal and a relatively thick layer of powdered softer metal, heating said compact to sinter said layers of powdered metal and thereby form a one-piece multi-layer billet, pressing said billet to increase its density, placing said billet in a pressure chamber having a converging end wall with a die opening therein such that the hard metal layer of said billet faces said die opening and then extruding said billet through said die opening to thereby form said billet into a member having a thin elongated outer metal sheath of hard metal filled with a soft metal core.

9. A process for making a composite metal member comprising the steps of forming a pressed compact having a relatively thin flat layer of powdered hard metal and a relatively thick flat layer of powdered soft metal, heating said compact to sinter said layers of powdered metal and thereby form a one-piece multi-layer billet, pressing said billet to increase its density, placing said billet in a pressure chamber having a converging end wall with a die opening therein such that the thin layer of said billet faces the die opening and then extruding said billet through said die opening to thereby form said billet into a member having a thin elongated outer hard metal sheath filled with a soft metal core.

10. A process for making a composite metal member comprising the steps of forming a pressed metal powder compact having a relatively thick soft metal layer and a relatively thin hard metal layer, one of said layers having a raised portion and the other of said layers having a mating depression at the interface between said layers, heating said compact to sinter said layers of powdered metal and thereby form a one-piece multi-layer billet, pressing said billet to increase its density, placing said billet in a pressure chamber having a converging end with a die opening therein such that the hard metal layer of said billet faces said die opening and then extruding said billet through said die opening to thereby form the billet into a member having an outer hard metal sheath filled with a soft metal core.

11. A process for making a rod-shaped composite metal member comprising the steps of forming a pressed metal powder compact having a relatively thick soft metal layer and a relatively thin hard metal layer, one of said layers having raised center and peripheral portions with a depressed generally annular portion therebetween, and the other of said layers being shaped to mate with said portions at the interface between said layers, heating said compact to sinter said layers of powdered metal and thereby form a one-piece multi-layer billet, placing said billet in a pressure chamber having a converging end with a die opening therein such that the hard metal layer of said billet faces said die opening, and then extruding said billet, by pressing one layer toward the other, through said die opening to thereby form the billet into a member having an outer hard metal sheath closed at one end and open at the other and bonded to an inner soft metal core.

12. A process for making a composite metal member comprising the steps of forming a pressed metal powder compact having a relatively thin hard metal layer and a relatively thick layer of another powdered metal, one of said layers having a raised portion and the other of said layers having a mating depression at the interface between said layers, heating said compact to sinter said layers of powdered metal and thereby form a one-piece multi-layer billet, placing said billet in a pressure chamber having a converging end with a die opening therein such that the thin metal layer of said billet faces said die opening and then extruding said billet through said die opening to thereby form the billet into a member having an outer hard metal sheath filled with an inner metal core.

References Cited in the file of this patent

UNITED STATES PATENTS

| | | |
|---|---|---|
| 1,910,884 | Comstock | May 23, 1933 |
| 2,023,498 | Winston | Dec. 10, 1935 |
| 2,155,274 | Kenah | Apr. 18, 1939 |
| 2,175,899 | Kelly | Oct. 10, 1939 |
| 2,320,498 | Wheeler | June 1, 1943 |
| 2,358,667 | Stern | Sept. 19, 1944 |
| 2,383,766 | Brassert | Aug. 28, 1945 |
| 2,389,061 | Kuzmick | Nov. 13, 1945 |